United States Patent [19]

Doenges et al.

[11] 3,964,915
[45] June 22, 1976

[54] INVESTMENT WAX

[75] Inventors: Richard E. Doenges, North Alliance; James E. Amelung, Minerva, both of Ohio

[73] Assignee: TRW Inc., Cleveland, Ohio

[22] Filed: Dec. 26, 1974

[21] Appl. No.: 536,634

[52] U.S. Cl. ............................. 106/38.6; 106/38.7; 106/38.8; 106/219; 106/230; 106/268; 106/270; 260/23.3; 260/28.5 A
[51] Int. Cl.² ...................... B28B 7/34; C08L 91/06
[58] Field of Search ................ 106/38.6, 38.7, 38.8, 106/38.24, 219, 230, 268, 270; 260/18 R, 23.3, 28.5 A

[56] References Cited
UNITED STATES PATENTS

| | | | |
|---|---|---|---|
| 2,348,687 | 5/1944 | Abrams et al. | 106/219 |
| 2,795,505 | 6/1957 | Finck et al. | 106/38.8 |
| 3,140,268 | 7/1964 | Halpern et al. | 106/38.8 |
| 3,655,414 | 4/1972 | Hoffman | 106/38.8 |
| 3,704,145 | 11/1972 | Ware et al. | 106/38.8 |
| 3,748,155 | 7/1973 | Speyer | 106/38.8 |
| 3,854,962 | 12/1974 | Speyer | 106/38.8 |

*Primary Examiner*—Lorenzo B. Hayes
*Attorney, Agent, or Firm*—Hill, Gross, Simpson, Van Santen, Steadman, Chiara & Simpson

[57] ABSTRACT

An improved pattern material for the production of precision investment casting molds, the pattern material being characterized by a low injection temperature, a low coefficient of expansion and insubstantial cavitation after injection into a pattern die. The pattern comprises a mixture in which the predominating constituent is a mixture of stearic and palmitic acids, a thermoplastic resin which is compatible with the fatty acid-wax mixture employed in an amount less than the aforementioned mixture of fatty acids, a wax having a melting point by the ball and ring method of from 160° to 180°F (71° to 82°C) in an amount less than that of the thermoplastic resin, a fatty acid amide slip agent in an amount less than the amount of wax and a relatively small amount of at least one metal stearate.

6 Claims, No Drawings

INVESTMENT WAX

BACKGROUND OF THE INVENTION

1. Field of the Invention

This invention is in the field of wax-type compositions suitable for use as pattern materials in the conventional mold making process for precision investment casting. The two major constituents of the composition are a mixture of palmitic and stearic acids, in combination with a compatible thermoplastic resin, with minor amounts of a wax, a fatty acid amide and at least one metal stearate.

2. Description Of The Prior Art

The precision investment casting process, known as the "lost wax" process has been used in the manufacture of molds for hundreds and perhaps thousands of years. Basically, the process consists in forming a pattern of a heat disposable material, usually formed of a wax or waxy material, forming a mold about the pattern by successively dipping the pattern into dispersions of finely divided ceramic particles, with intermediate application of relatively coarse, stuccoing particles. A shell-type mold is thus built up around the pattern and when the pattern is removed by means of firing in a furnace, steam autoclaving and the like, a shell mold results having a molding cavity which is an exact duplicate of the original pattern.

The British publication entitled "Pattern Materials and Their Use in Investment Casting" prepared by the B. I. C. T. A. Pattern Making Committee, has set forth a summary of the physical properties of pattern materials which are required in modern day usage of the lost wax process. For one, the wax must be safe to handle as a solid and must not give rise to noxious fumes upon melting or burning out. In addition, the wax should have a low ash content on the order of 0.05% or so. Good oxidation resistance is required since the molten pattern wax tends to oxidize slowly in the air. The waxy material must also be resistant to any organic solvent or alkali which may be present in the dipping slurries. Where the patterns are formed by injection molding, which is the usual technique, they must be capable of quick setting. In addition, the plasticity or ductility of the pattern material must be low at ambient temperatures so that patterns and assemblies do not sag under their own weight but at the same time, the pattern wax must not be brittle.

The pattern material must have sufficient strength to be handled during molding operations, and still possess a certain degree of resilience particularly in the areas of the sprues which must carry the weight of the patterns while the patterns are being dipped in the wet refractory slurries. Patterns must also be reasonably hard at room temperature so that the patterns can be handled throughout the assembly operations. They must also evidence an ability to produce strong welds so that an assembly of pattern clusters can be conveniently made.

The surface finish of a pattern must be good if faithful reproduction is to be achieved in the investment mold. Where a blend of materials is used as a pattern, materials must be compatible with each other, i.e., they must dissolve in each other to a point where separation will not occur when the mixture is held within a given temperature range. The thermal characteristics of the wax are also important, particularly the viscosity at the optimum injection temperature, and the expansion-contraction characteristics. Low shrinkage is particularly important if a precise mold cavity is to be obtained from the pattern.

As the precision investment mold making procedure has advanced, the patterns used in such mold making have increased in size and mass. Patterns for cores have become quite delicate to the point that they are difficult to inject. Going to multiple waxes has not been a satisfactory solution since this increases the quantity of injection equipment and lost machine time. As the part shape becomes more complicated, an increase in pattern repair and scrap results. The need still remains, therefore, for a pattern material which has a low injection temperature, a low coefficient of expansion, and insubstantial cavitation after injection into a pattern die.

There are examples in the prior art illustrating the use of various fillers to wax compositions in order to reduce the contraction of the wax. While this technique has met with some success, it has introduced some problems of its own. Carbon black, for example, is not particularly satisfactory as a filler because of the difficulty in handling finely divided particles. Polystyrene spheres have been used but they tend to coagulate in the molten wax at high melt temperatures. The use of urea has met with some success, but this material absorbs water and breaks down at elevated temperatures. Carbohydrates such as sucrose are limited in their applicability because they are affected by moisture. Organic acids such as adipic acid are sometimes satisfactory, but the acidity of these acids affects ceramic molds, and they tend to gum up in the molten wax at high temperatures.

In the patent art, Feagin U.S. Pat. No. 3,316,105 describes a pattern wax composition in which the shrinkage characteristics are improved, i.e., lowered by the addition to the wax of certain diamides of polyamino compounds.

Larson U.S. Pat. No. 3,801,335 describes a pattern wax composition in which there is a filler material consisting of particles of pentaerythritol or an oligomer thereof.

Speyer U.S. Pat. No. 3,854,962, assigned to the assignee of the present application, describes a pattern composition containing one or more waxes and a combustible polyhydric alcohol in combination with an organic fatty acid which suspends the polyhydric alcohol filler.

SUMMARY OF THE INVENTION

The present invention provides a pattern composition with a formulation in which the speed of set can be controlled by variations in the formulation. The pattern material is relatively stable dimensionally over a wide range of part sizes and injection parameters. The composition evidences minimal surface cavitation even in pattern areas with a large mass. The composition has a very low injection temperature and a low melt-out temperature. The low injection temperature reduces the total wax contraction. It has a low coefficient of thermal expansion and is capable of absorbing die release agents so that it is compatible with water based dipping slurries without requiring a solvent wash. The composition evidences no attack on mold faces when the composition is removed either by treatment in an autoclave or by flash firing. The composition can be used to make large structural parts or delicately cored parts with a minimum of scrap or repair. In addition, the materials employed are commercially available and they are relatively inexpensive.

The predominating ingredient of the pattern composition of the present invention is a mixture of palmitic and stearic acids. It has been found that the speed of set during injection can be controlled by the relative ratio of the two fatty acids. The new pattern material also includes a compatible thermoplastic resin which is present in an amount smaller than that of the fatty acid mixture and which preferably has a melting temperature by the ball and ring method of from 90° to 125°C. A third ingredient is the wax having a melting point by the ball and ring method of from 160° to 180°F (71° to 82°C). An additional ingredient consists of a fatty acid amide in relatively small amounts. Finally, one or more metal stearates are included as a backbone material.

DESCRIPTION OF THE PREFERRED EMBODIMENTS

The composition of the present invention includes a mixture of stearic and palmitic acids in which the stearic acid usually predominates. The total amount of the mixture of these fatty acids may range from about 47 to 53% by weight of the entire composition. In this mixture, the stearic acid comprises about 43 to 98% by weight of the total fatty acids. In addition to palmitic acid and stearic acid, as much as 2% or so of other fatty acids may be included.

The new composition also includes a thermoplastic resin which is compatible with wax and fatty acids, and has a ball and ring melting point in the range from 90°to 125°C. By "compatible" we mean that the resin will be taken up in solution in the molten-wax-fatty acid mixture and upon solidification it will stay in homogeneous suspension.

The resins useful for the purposes of this invention have been extensively used in the rubber industry where they are referred to as "rubber compounding resins". In the rubber art, they are employed as tackifying additives. In the compositions of the present invention, they cause the wax-fatty acid mixture to set up and provide improved cohesion and strength properties.

The resins which are useful for our purposes can be widely different chemically. For example, they can be indene polymers, coumarone-indene polymers or blends of the same. Commercial resins employing complex mixtures of such polymers are available under tradenames such as "Piccovar 420", "Picco 100", Piccomer 100", "Nevchem 100"and "SuperstaTac 100". The following table sets forth the physical properties of Piccovar 420 one of the preferred resins for use in the practice of the present invention.

| | |
|---|---|
| Color Range, Coal Tar Scale | 3-5 |
| Softening Point, °C | 100 |
| Acid number, max. | 1 |
| Saponification Number, max. | 1 |
| Bromine number | 17 |
| Specific Gravity | 1.05 |
| Refractive Index | 1.60 |
| Gardner Viscosity of 60% solution in Mineral Spirits, Poises | 3.0 |
| Gardner Viscosity of 60% solution in Toluene, Poises | 0.8 |
| Melt Viscosity -   1 poise at °C | 185 |
|  10 poises at °C | 140 |
|  100 poises at °C | 120 |

The thermoplastic resins may be present in amounts of about 31 to 35% by weight of the entire pattern making composition.

Still other resins which can be employed are those which are polymers of methyl styrene, methyl indene, cross-linked aliphatics such as methyl methacrylate resins, and polymers of alpha and beta pinene. The wax ingredient of the present composition is preferably a microcrystalline wax having a ball and ring melting point ranging from about 160°to 180°F (71° to 82°C) and preferably from 168° to 178°F (75° to 81°C). The microcrystalline wax should have a low oil content and a penetration hardness of 15 to 25 (0.1 mm) with a 100 gram weight for 5 seconds. Other waxes, however, can also be employed such as paraffin wax, montan wax, beeswax, carnauba wax, castor wax, and candellilla wax. The wax is present in an amount of from about 9 to 11% by weight of the total composition.

Another ingredient included in the composition of the present invention is a fatty acid amide in an amount of from 2.5 to 3.5% by weight to function as a release agent and intercrystalline slip agent to minimize warp. The preferred material is the amide of octadecanoic acid (stearamide) but other fatty acid amides can also be used, such as those containing 12 to 22 carbon atoms per molecule.

Finally, the composition includes one or more metal stearates, preferably an aluminum polystearate in combination with magnesium distearate. The aluminum tristearate or distearate is present in an amount of from 1.5 to 2.5% by weight, while magnesium distearate may be added in amounts of from about 0.5 to 1.5% by weight.

The following specific formulation sets forth a particularly preferred embodiment of the present invention:

| | |
|---|---|
| Mixture of 70% stearic, 30% palmitic acids | 50% by weight |
| Alkyl aromatic resin ("Piccovar 420") | 33% by weight |
| Microcrystalline wax (m.p. 168–178°F) | 10% by weight |
| Stearamide (Octadecanoic acid amide) | 3% by weight |
| Aluminum Tristearate | 2.5% by weight |
| Magnesium distearate | 1.5% by weight |

The composition of the present invention has a speed of set which can be controlled before injection by changing the ratio of palmitic to stearic acids. This is important because it permits essentially the same wax formulation to be used in the production of various types of investment casting molds of different geometries and thicknesses. Heretofore, this required significant changes in wax formulations when going from one type of mold production to another which required increased amounts of injection equipment and lost machine time.

It should be evident that various modifications can be made to the described embodiments without departing from the scope of the present invention.

We claim as our invention:

1. In a pattern composition characterized by a low injection temperature, a low coefficient of expansion and insubstantial cavitation after injection into a pattern die comprising waxes, fatty acids, and thermoplastic resins, the improvement comprising as said ingredients: the composition consisting essentially of 1. 47 to 53% by weight of a mixture of stearic and palmitic acids of which 43 to 98% by weight is stearic acid,
2. wax in the amount of about 9 to 11% by weight,
3. about 31 to 35% by weight of a thermoplastic resin having a ball and ring melting point in the range of 90° to 125°C said resin being compatible with said wax and acids,
4. from 2.5 to 3.5% by weight of a fatty acid amide containing 12 to 22 carbon atoms per molecule which functions as a release agent and intercrystalline slip agent, and
5. from 1.5 to 2.5% by weight of aluminum polystearate and/or magnesium distearate.

2. The composition of claim 1 in which said wax is a microcrystalline wax.

3. The composition of claim 1 in which said fatty acid amide is octadecanoic acid amide.

4. The composition of claim 1 in which said stearate is a mixture of aluminum and magnesium stearates.

5. The composition of claim 4 in which said mixture of stearic and palmitic acids contains about 70% by weight stearic acid and about 30% by weight palmitic acid.

6. The composition of claim 4 in which said mixture contains from 1.5 to 2.5% by weight of an aluminum polystearate and from 0.5 to 1.5% by weight of magnesium distearate.

* * * * *